United States Patent [19]

Irrgeher

[11] 4,451,519

[45] May 29, 1984

[54] DRAWING MATERIAL BACKING FOR MAKING TECHNICAL AND DIAGRAMMATIC DRAWINGS

[76] Inventor: Hans Irrgeher, Dauphinestrasse 144, A-4020 Linz, Austria

[21] Appl. No.: 452,796

[22] Filed: Dec. 23, 1982

[30] Foreign Application Priority Data

Dec. 29, 1981 [EP] European Pat. Off. ........ 81890212.4

[51] Int. Cl.[3] ........................... B32B 3/30; B32B 3/28

[52] U.S. Cl. .................................... 428/167; 428/156; 428/179; 428/212; 428/343; 434/90; 434/92

[58] Field of Search ............... 428/167, 156, 212, 174, 428/343, 179; 434/90, 92, 85

[56] References Cited

U.S. PATENT DOCUMENTS 3,760,940 9/1973 Bustin ................................. 428/166

4,343,848 8/1982 Leonard, Jr. ........................ 428/156

FOREIGN PATENT DOCUMENTS 358952 2/1980 Austria .

*Primary Examiner*—Raul J. Thibodeau

*Attorney, Agent, or Firm*—Kurt Kelman

[57] ABSTRACT

A drawing material backing (1) is provided which serves to make technical and diagrammatic drawings and is provided on one side with an impressed orthogonal grid (2), which consists of defining pyramid-shaped embossed elevations (8) and has a grid line spacing (3) of 0.5 or 1 millimeter, so that the free-hand drawing of straight lines or of lines intersecting at right angles and with a selected spacing by means of a pencil, ballpoint pen or a paste-applying pen on a paper sheet applied to the backing will be facilitated. To improve the guidance of drawing implements having writing points or writing balls (9, 10) which differ greatly in diameter and to prevent an impression into the drawing paper, the side faces (5, 5*a*) of the grooves include a steeper angle (6) next to the bottom (4) of the groove and a flatter angle (7) in their upper portion so that the embossed elevations have the shape of pyramids (8) having angled sides. The paper sheet is retained by a replaceable adhesive tape (11), which with an adhesive coating having a stronger adhesive force has been stuck to the backing at one longitudinal edge on the surface provided with the grid and which carries on its free side an adhesive coating that has a weaker adhesive force. (FIG. 2)

3 Claims, 2 Drawing Figures

DRAWING MATERIAL BACKING FOR MAKING TECHNICAL AND DIAGRAMMATIC DRAWINGS

This invention relates to a drawing material backing for making technical and diagrammatic sheeting, which is provided on one side with an impressed orthogonal grid consisting of crossing fine V-shaped guiding grooves, which have a spacing of 0.5 or 1 millimeter and define pyramid-shaped embossed elevations.

Such a drawing material backing is known from Austrian patent specification No. 358,952. The side faces of the grooves include an angle of 90°. Owing to the flexibility or yieldability of a paper sheet which has been placed on the backing, a drawing implement which is applied, such as the point of a pencil or the ball of a ballpoint pen, will have a certain guidance in the grooves so that the drawing of straight lines corresponding to individual grooves of the grid will be facilitated. Such lines can be drawn after a short time of accustoming and the grid spacing can also be used as a scale so that free-hand drawings can be made which consist of straight lines and are true to scale.

It has been found that the known drawing material backing has the disadvantage that the relatively sharp apices of the pyramids may impress themselves into the rear surface of the paper and that a really good guidance of the point of the drawing implement will not be obtained unless relatively fine points are used.

It is an object of the invention to avoid the disadvantages which have been pointed out and to provide a drawing material backing which is of the stated kind and which ensures a satisfactory guidance also for writing and drawing implements having points which differ greatly in diameter and which avoids an impression into the paper or other drawing material. A partial object of the invention is to permit with simple means an adequate fixation of the drawing paper or other drawing material on the drawing material backing.

In a drawing material backing of the stated kind, the object set forth is accomplished in that the side faces of the grooves include a steep angle next to the bottom of the groove and include a flatter angle in their upper portion so that the embossed elevations have the shape of pyramids having angled sides.

In the design according to the invention the resulting pyramids having angled sides have relatively blunt apices so that they will hardly impress the paper or other drawing material. The steep portions of the side faces of the grooves constitute guides for implements which have fine points, i.e., which are small in diameter, and the flatter portions of the side faces constitute guides for drawing implements which are larger in diameter. The side faces of the grooves preferably include an angle of about 90° at the bottom of the groove and an angle of about or at least 120° in their upper portions. Owing to the flatter slope of the upper portions of the side faces of the grooves, an adequate guidance will be provided even for drawing implements which have a point diameter exceeding the grid line spacing. Specifically, relatively blunt drawing implements, i.e., pencils sharpened to have a blunt point and ballpoint pens having a ball diameter in excess of the grid line spacing, will still be adequately guided. The embossed elevations consisting of pyramids having angled sides can be more easily made by means of hot calender rolls than the known pointed pyramids. To facilitate the making of true-to-scale drawings, the drawing material backing may be made from transparent plastic sheeting which is provided on its rear surface with a printed millimeter grid, which is congruent to the grid. It is also possible to use squared or preruled drawing paper which has a larger line spacing than the grid formed by the grooves so that the latter grid will facilitate the subdividing of the grid on the drawing paper in the making of drawings which are true to scale.

The flatter top portions of the pyramids improve the support for the drawing material and facilitate the drawing of lines which do not follow the grid.

Owing to the flatter top portions of the pyramids, the partial object set forth to facilitate the fixation of the drawing material to the backing or of the backing to the drawing material can be more easily accomplished. That partial object is accomplished in that an adhesive tape provided on both sides with adhesive coatings differing in adhesive force is adapted to be releasably adhered with the adhesive coating which has the stronger adhesive force to the backing along at least one longitudinal edge on the side provided with the grid. That adhesive tape is sufficiently retained in use. On the other side of the adhesive tape the drawing material is sufficiently retained to prevent a slipping of that material during the drawing work. If a sketch pad is used, the drawing material backing will be inserted below the top sheet of the pad and the adhesive tape will be attached to that side of the backing which is disposed at the free end of the pad. Experience has shown that that side of the adhesive tape which is intended to retain the drawing material will be soiled and lose its adhesive force in the course of time. The adhesive tape can then be removed from the drawing material backing and be replaced by a new adhesive tape. Before use, the adhesive coatings of the adhesive tape can be protected from being soiled by the provision of a strippable film, paper coverings or protective wrappers.

BRIEF DESCRIPTION OF THE DRAWINGS

The subject matter of the invention is illustrated by way of example on the drawing, in which.

DESCRIPTION OF THE PREFERRED EMBODIMENTS

Figure 1:
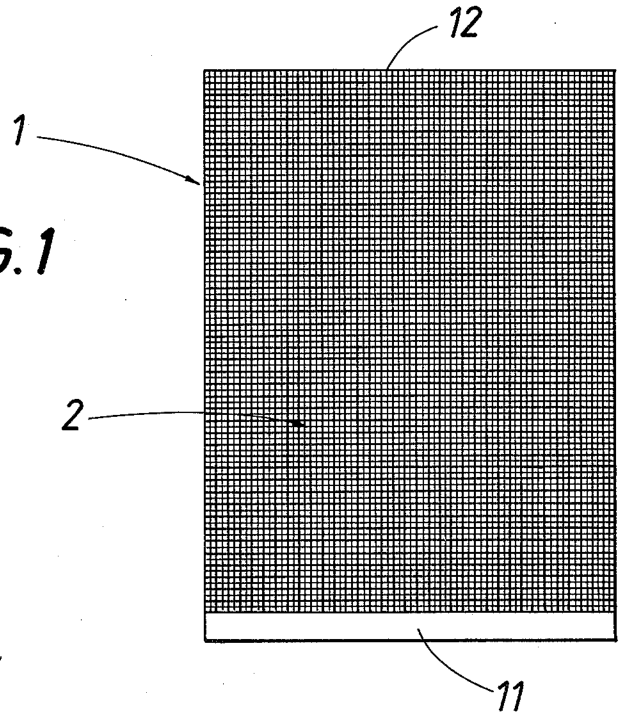
FIG. 1 is a diagrammatic top plan view showing a drawing material backing according to the invention and FIG. 2 is a greatly enlarged sectional view showing the drawing material backing.
Figure 2:
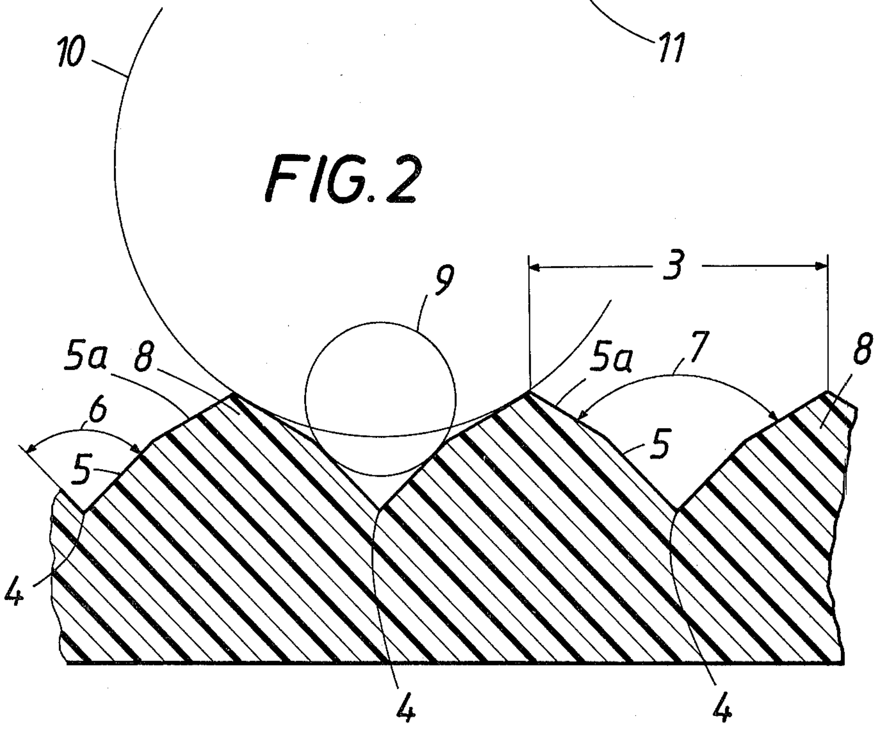

A drawing material backing 1 of any desired size consists of a transparent flexible plastic sheeting and is provided on one side with an orthogonal grid 2 consisting of impressed V-shaped grooves having a spacing of 0.5 or 1 millimeter. In FIG. 2 the grid line spacing 3 is indicated for the grooves extending in one direction. The side faces 5 of the grooves include adjacent to the bottom 4 of the groove a steep angle 6 of, e.g., 90°. In the upper portion the side faces 5*a* of the grooves include a flatter angle 7 so that the resulting pyramid-shaped embossed elevations 8 have the shape of pyramids having angled sides. FIG. 2 shows that owing to that arrangement drawing implements having points which differ in diameter or ballpoint pens having balls 9, 10 differing in diameter will always be guided satisfactorily the side faces 5 or the side face portions 5*a*. The included angle 7 amounts to, e.g., 120°. As has been shown, the transition between the side face portions 5 and 5*a* may be constituted by a shape edge, as shown, or may be arcuate.

An adhesive tape 11 is stuck to the backing 1 along one longitudinal edge on that side which is provided with the grid. That adhesive tape has an adhesive coating having a stronger adhesive force on the side facing the grid and an adhesive coating having a weaker adhesive force on its upwardly facing side. In use, that backing is inserted under the top sheet of a writing pad or sketch pad so that the end 12 of the backing is disposed in the stitched end of the pad and the free lower end of the top sheet can be held in position for the drawing work by being slightly urged against the adhesive tape 11 and can easily be peeled off thereafter. If the drawing material backing 1 is used for individual sheets, the adhesive tape 11 may be attached to the backing 1 at least at two sides thereof.

It will be understood that the drawing material backing can be used with a paper holder, which in most cases comprises a stiff support and an edge holder for the paper and the present drawing material backing.

I claim:

1. A drawing material backing for making technical and diagrammatic drawings, comprising a flexible plastic sheeting provided on one side with an impressed orthogonal grid consisting of intersecting fine V-shaped guiding grooves uniformly spaced apart 0.5 or 1 millimeter and defining pyramid-shaped embossed elevations, the grooves having a bottom and side faces including a steep angle next to the bottom of the groove and a flatter angle in their upper portion so that the embossed elevations have the shape of pyramids having angled sides.

2. A drawing material backing according to claim 1, characterized in that the side faces of the grooves include an angle of about 90° at the bottom of the groove and an angle of about or at least 120° in their upper portions.

3. A drawing material backing according to claim 1 or 2, characterized in that an adhesive tape provided on both sides with adhesive coatings differing in adhesive force is releasably adhered with that adhesive coating which has the stronger adhesive force to the backing along at least one longitudinal edge on the side provided with the grid.

* * * * *